United States Patent
Gaucher

(10) Patent No.: US 10,391,978 B2
(45) Date of Patent: Aug. 27, 2019

(54) WIPER DEVICE FOR MOTOR VEHICLES

(71) Applicant: Valeo Systèmes d'Essuyage, Le Mesnil Saint Denis (FR)

(72) Inventor: Vincent Gaucher, Ennezat (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 545 days.

(21) Appl. No.: 14/945,699

(22) Filed: Nov. 19, 2015

(65) Prior Publication Data

US 2016/0144829 A1    May 26, 2016

(30) Foreign Application Priority Data

Nov. 20, 2014    (FR) ...................................... 14 61222

(51) Int. Cl.
| | |
|---|---|
| *B60S 1/38* | (2006.01) |
| *B60S 1/34* | (2006.01) |
| *H01F 38/14* | (2006.01) |
| *G11B 5/09* | (2006.01) |
| *B60S 1/40* | (2006.01) |

(52) U.S. Cl.
CPC ............ *B60S 1/3805* (2013.01); *B60S 1/345* (2013.01); *B60S 1/38* (2013.01); *B60S 1/3868* (2013.01); *B60S 1/4045* (2013.01); *G11B 5/09* (2013.01); *H01F 38/14* (2013.01)

(58) Field of Classification Search
CPC .......... B60S 1/3805; B60S 1/345; B60S 1/38; H01F 38/14; G11B 5/09
USPC ......................................... 15/250.07, 250.06
See application file for complete search history.

(56) References Cited

U.S. PATENT DOCUMENTS

| | | | | |
|---|---|---|---|---|
| 5,676,868 A | * | 10/1997 | Simmons ............... | B60S 1/3803 15/250.05 |
| 2008/0034528 A1 | * | 2/2008 | Bourke ................. | B60S 1/3805 15/250.06 |
| 2010/0125967 A1 | | 5/2010 | Lieven | |

FOREIGN PATENT DOCUMENTS

| | | |
|---|---|---|
| FR | 2987016 A1 | 8/2013 |
| WO | 2008021991 A2 | 2/2008 |
| WO | WO 2012089552 A1 * | 7/2012 ............ B60S 1/3881 |

OTHER PUBLICATIONS

Preliminary Search Report issued in corresponding French Application No. 1461222, dated Jul. 29, 2015 (7 pages).

* cited by examiner

*Primary Examiner* — Monica S Carter
*Assistant Examiner* — Katina N. Henson
(74) *Attorney, Agent, or Firm* — Osha Liang LLP

(57) ABSTRACT

The invention concerns a wiper device (1) comprising:
  a driving arm (7) configured to transmit a wiping movement and having a longitudinal end (8),
  a windscreen wiper (3),
  a fixing device (5) disposed between the longitudinal end (8) of the arm (7) and the windscreen wiper (3),
  wherein the wiper (3) is equipped with at least one electrical element (23), characterized in that the longitudinal end (8) of the arm (7) is equipped with a sending coil (27) and in that the wiper (3) is equipped at the level of the fixing device (5) with a receiving coil (29), the cooperation of the sending coil (27) with the receiving coil (29) enabling supply of power to said electrical element (23) by magnetic induction.

11 Claims, 3 Drawing Sheets

WIPER DEVICE FOR MOTOR VEHICLES

Figure 1:
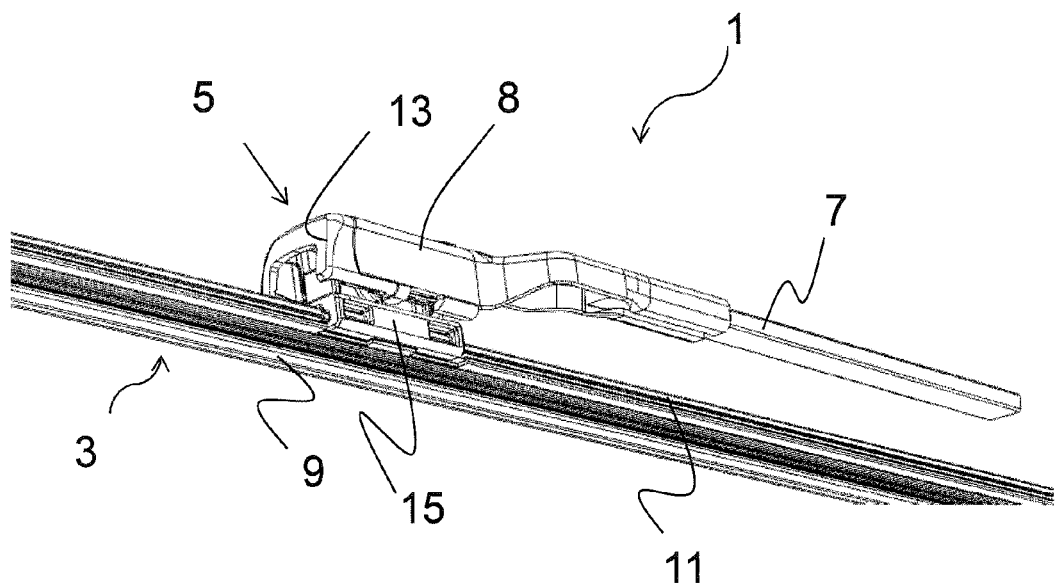

The present invention relates to a wiper device.

For a number of years, there have been considerable advances in windscreen wipers and wiper systems for motor vehicles.

One of the major advances concerns the wiping of windows, such as the windscreen, for example, in cold weather, notably when there is a deposit of ice or frost on the window.

In order for the user to be able to regain visibility rapidly, it has been proposed to heat the windscreen washing liquid, for example, to melt rapidly ice or ice crystals on the window.

This windscreen washing liquid may be heated in its storage tank or as it travels in hydraulic pipes.

However, it has proved judicious to equip the wipers themselves with a heating system, for example positive temperature coefficient (PTC) ceramic elements or heating resistances, in direct contact or not with the windscreen washing liquid to heat the latter or the immediate environment of the wiper, the windscreen washing liquid being fed to the wiper itself in order to be sprayed onto the window just ahead of the wiper blade.

The application FR 2 987 016 in the name of the Applicant describes for example a wiper blade equipped with heating elements, for example radiant heating elements, for melting snow, frost, or ice present on a motor vehicle window.

In this case, electrically conductive wires must be fed as far as the wiper to enable the supply of electrical power to the heating elements.

For a user, changing the wiper if worn can prove complicated if it is additionally necessary to pay attention to connecting the wiper to the arm not only mechanically but also electrically. In some cases the user may forget to make the electrical connection or in other cases, if they do not take care, a malfunction may be produced if water infiltrates into one of the parts of the electrical connector.

Moreover, given that this connection between the wiper arm and the wiper is exposed to all inclement weather, the part of the connector remaining on the wiper arm side may be degraded, for example by corrosion or soiling, and render the supply of power to the heating elements carried by the wipers inoperative.

The document WO08021991 proposes to make an inductive electrical connection between the windscreen and the wiper.

To this end, a sending coil is attached to the windscreen, inside the passenger compartment, to heat the wiper by magnetic induction.

This solution undoubtedly makes it possible to circumvent electrical connection problems at the level of the mechanical connector between the wiper and the wiper arm, but this solution does not prove satisfactory in that the system of the above document functions only with the wiper device stopped with the wiper facing the sending coil attached to the windscreen.

A further result of this is that the washing fluid cannot be heated when the windscreen wipers are operating.

What is more, given existing standards, it is difficult to place elements on the windscreen, even at its periphery, without reducing the driver's view.

The present invention proposes to remedy the drawbacks referred to above at least in part by providing a solution enabling an efficient electrical connection even when the wiper device is operating and that allows easy replacement of a wiper to change it.

To this end, the invention consists in a wiper device comprising:
- a driving arm configured to transmit a wiping movement and having a longitudinal end,
- a windscreen wiper,
- a fixing device disposed between the longitudinal end of the arm and the windscreen wiper, wherein the wiper is equipped with at least one electrical element, characterized in that the longitudinal end of the arm is equipped with a sending coil and in that the wiper is equipped at the level of the fixing device with a receiving coil, the cooperation of the sending coil with the receiving coil enabling supply of power to said electrical element by magnetic induction.

Thus the electrical connection may be made in a manner that is transparent for the user when making the mechanical connection between the wiper arm and the wiper.

The wiper device in accordance with the invention may also have one or more of the following features, separately or in combination:

For example, the fixing device comprises an adapter intended to be fixed to the longitudinal end of the arm and a connector articulated to the adapter and intended to be fixed to the windscreen wiper, and the receiving coil is carried by the adapter or the connector.

The longitudinal end of the arm is in the form of a support yoke.

The sending coil may be disposed on a lower face of the support yoke facing the adapter.

The receiving coil may be disposed on a lower face of the connector facing the wiper or on a spine of the wiper at the level of the connector.

To facilitate manufacture and protection of the coils, the sending coil is overmoulded in the support yoke and the receiving coil is overmoulded in the connector.

For example, the receiving coil is electrically connected to the electrical element.

For example, the electrical element is a heating element, notably a positive temperature coefficient ceramic or resistance or may comprise a measurement sensor.

The invention also concerns a driving arm for a wiper device as defined above, configured to transmit a wiping movement and having at one end a support yoke, characterized in that the support yoke is equipped with a sending coil enabling supply of electric power by magnetic induction.

The invention also concerns a windscreen wiper for a wiper device as defined above, comprising a connector fixed to the windscreen wiper equipped with at least one electrical element, characterized in that it comprises a receiving coil disposed at the level of the connector and enabling supply of electrical power to the electrical element by magnetic induction.

Figure 2:
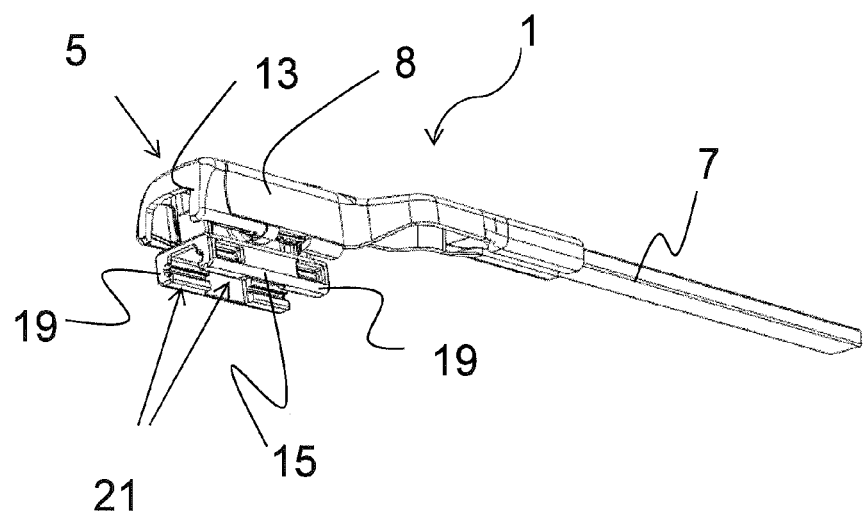
Figure 3:
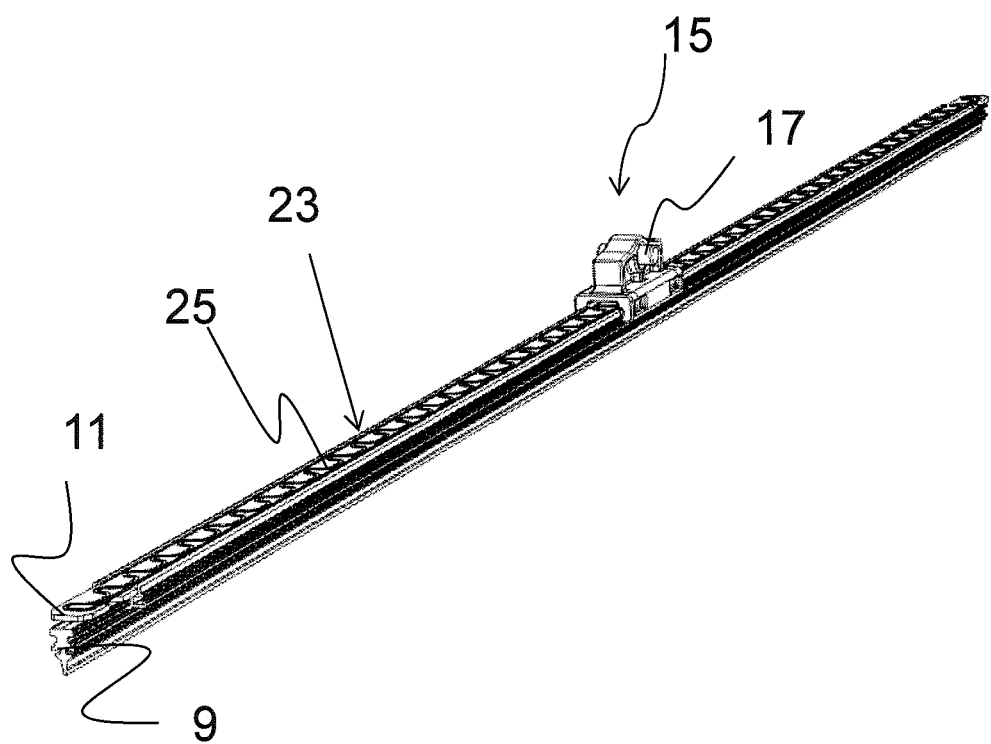
Figure 4:
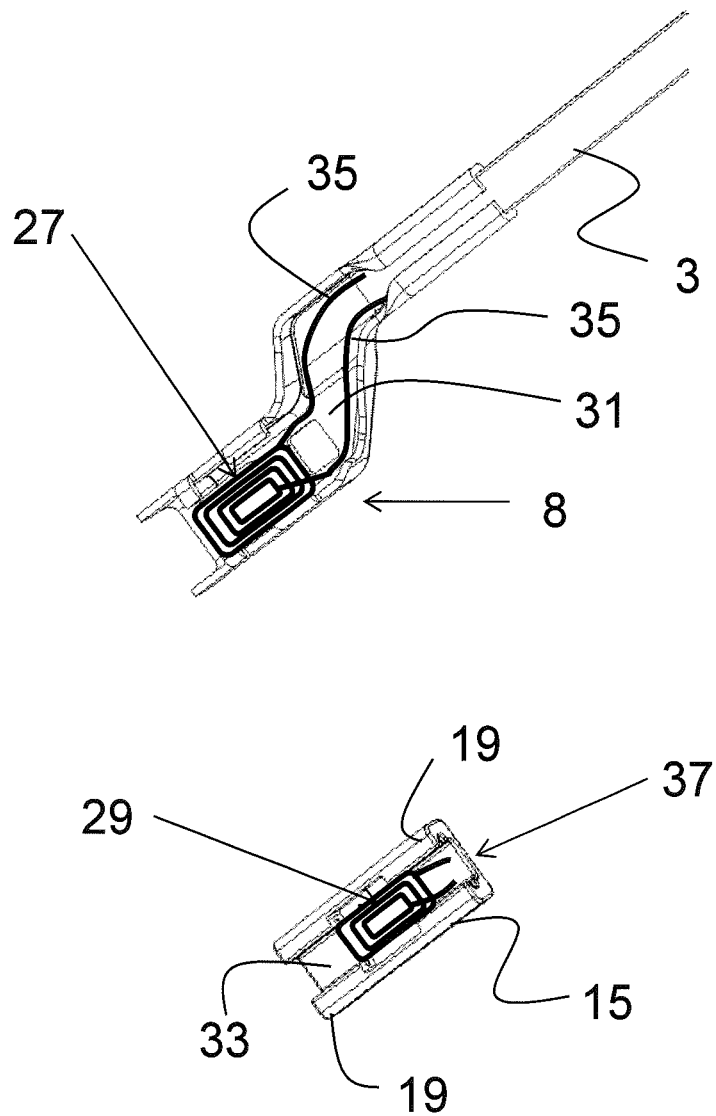

Other advantages and features will become apparent on reading the description of the invention and from the appended drawings, in which:

FIG. 1 is a diagrammatic perspective view of a wiper device in accordance with one embodiment of the invention, FIG. 2 is a partial view of FIG. 1 showing only the arm, the adapter and the connector, FIG. 3 is a diagrammatic perspective view of a wiper equipped with a connector, and FIG. 4 shows the same elements as FIG. 2 from below.

In these figures, identical elements bear the same reference numbers.

FIG. 1 shows a wiper device 1 or windscreen wiper comprising a wiper 3, a fixing device 5 and a wiper arm 7 including at one end a support yoke 8 connected to the wiper 3 by the fixing device 5.

The wiper 3 notably comprises a wiper blade 9 and one or more spines 11, here one spine 11 in the form of a metal blade, imparting to the wiper 3 a curvature enabling it to be applied correctly to a windscreen. The wiper 3 may also comprise a deflector and/or end fittings in particular holding the wiper blade 9 and the spine(s) 11 together.

The fixing device 5 comprises on the one hand an adapter 13 carried by the wiper arm 7 and on the other hand a connector 15 rigidly fixed to the wiper 3.

FIG. 2 shows only the connector 15 which is articulated to pivot on a pin 17 (see FIG. 3) on the adapter 13 carried by the wiper arm 7.

As shown in FIG. 3, the connector 15 is rigidly fixed to the wiper 3. To this end, it features two symmetrical flanges 19 (see FIGS. 1 and 2) sandwiching the wiper 3 at the level of the spine 11 of the wiper 3 in one of the housings 21 provided in the flanges 19 in the form of grooves.

In FIG. 3 there is also seen an electrical element 23 disposed on the spine 11 of the wiper 3 and which in the present case is a heating element 25 produced for example in the form of a resistance or a resistive wire.

The electrical element 23 may equally well be a positive temperature coefficient ceramic as the heating element or a measurement sensor, for example a capacitive sensor for measuring the wet or dry state of the windscreen near the wiper.

Electrical power is supplied to the electrical element 23 by transferring electrical energy by magnetic induction.

To this end, as shown in FIG. 4, the support yoke 8 is equipped with a sending coil 27 and the fixing device 5, here the connector 15 is equipped with a receiving coil 29.

The cooperation of the sending coil 27 with the receiving coil 29 therefore makes it possible to supply power to the electrical element 23 by magnetic induction.

The sending coil 27 is disposed on the lower face 31 of the support yoke 8, i.e. the face that faces the adapter 13.

The receiving coil 29 is disposed on the lower face 33 of the connector 15, i.e. the face that faces the wiper 3.

The sending coil 27 and the receiving coil 29 may be fixed by gluing, for example.

In accordance with a variant that is not shown, the sending coil 27 is overmoulded in the support yoke 8 and the receiving coil 29 is overmoulded in the connector 15.

The sending coil 27 is connected by electric wires 35 to the electrical network of the motor vehicle, for example.

The receiving coil 29 for its part is electrically connected to the electrical element 23 by electrical wires 37.

In accordance with a variant that is not shown, the sending coil 27 is an integral part of the heating element 25, i.e. the heating element 25 takes the form of the resistive wire that at the level of the connector 15 is wound so as to serve as the receiving coil 29, for example.

In accordance with a further development, the spine 11 is electrically insulative or has been rendered electrically insulative, for example by depositing an insulative layer, and the heating element 25 is silkscreened on the spine 11, at the level of the connector 15, the silkscreened pattern being conformed as windings able to serve as the receiving coil 29.

Because the sending coil 27 and the receiving coil 29 are integrated at the level of the support yoke 8 and the connector 15, respectively, when changing the wiper, the user no longer has to consider the electrical connection of the wiper 3, which is made automatically when effecting the mechanical fixing between the adapter 13 and the connector 15.

The invention claimed is:

1. A wiper device comprising:
   a driving arm configured to transmit a wiping movement and having a longitudinal end;
   a windscreen wiper; and
   a fixing device disposed between the longitudinal end of the arm and the windscreen wiper,
   wherein the windscreen wiper is equipped with at least one electrical element,
   wherein the longitudinal end of the driving arm is equipped with a sending coil and the windscreen wiper is equipped, at a level of the fixing device, with a receiving coil, the cooperation of the sending coil with the receiving coil, when making a mechanical connection between the driving arm and the windscreen wiper, enabling supply of power to said electrical element by magnetic induction between the coils.

2. The wiper device according to claim 1, wherein the fixing device comprises an adapter intended to be fixed to the longitudinal end of the arm and a connector articulated to the adapter and intended to be fixed to the windscreen wiper, and the receiving coil is carried by the adapter or the connector.

3. The wiper device according to claim 1, wherein the longitudinal end of the arm is in the form of a support yoke and the sending coil is disposed on a lower face of the support yoke facing the adapter.

4. The wiper device according to claim 2, wherein the receiving coil is carried by the connector and disposed on a lower face of the connector facing the wiper.

5. The wiper device according to claim 2, wherein the receiving coil is disposed on a spine of the wiper at the level of the connector.

6. The wiper device according to claim 2, wherein the sending coil is overmoulded in the support yoke and the receiving coil is overmoulded in the connector.

7. The wiper device according to claim 1, wherein the receiving coil is electrically connected to the electrical element.

8. The wiper device according to claim 1, wherein the electrical element is a heating element comprising a positive temperature coefficient ceramic or resistance.

9. The wiper device according to claim 1, wherein the electrical element comprises a measurement sensor.

10. A driving arm for a wiper device, the driving arm being configured to transmit a wiping movement and comprising at one longitudinal end a support yoke, wherein the support yoke is equipped with a sending coil enabling supply of electric power by magnetic induction, the wiper device comprising: a windscreen wiper; and a fixing device disposed between the longitudinal end of the arm and the windscreen wiper, wherein the windscreen wiper is equipped with at least one electrical element, wherein the windscreen wiper is equipped, at a level of the fixing device, with a receiving coil, the cooperation of the sending coil with the receiving coil, when making a mechanical connection between the driving arm and the windscreen wiper, enabling supply of power to said electrical element by magnetic induction between the coils.

11. A windscreen wiper for a wiper device, the wiper comprising: a connector fixed to the windscreen wiper equipped with at least one electrical element and a receiving coil disposed at a level of the connector and enabling supply of electrical power to the electrical element by magnetic induction, the wiper device comprising: a driving arm configured to transmit a wiping movement and having a longitudinal end equipped with a sending coil, a fixing device disposed between the longitudinal end of the arm and the windscreen wiper, wherein the windscreen wiper is equipped with at least one electrical element, and wherein cooperation of the sending coil with the receiving coil, when making a mechanical connection between the driving arm and the windscreen wiper, enables supply of power to said electrical element by magnetic induction between the coils.

* * * * *